E. R. MORRISON.
Toy-Bank.
No. 206,893. Patented Aug. 13, 1878.
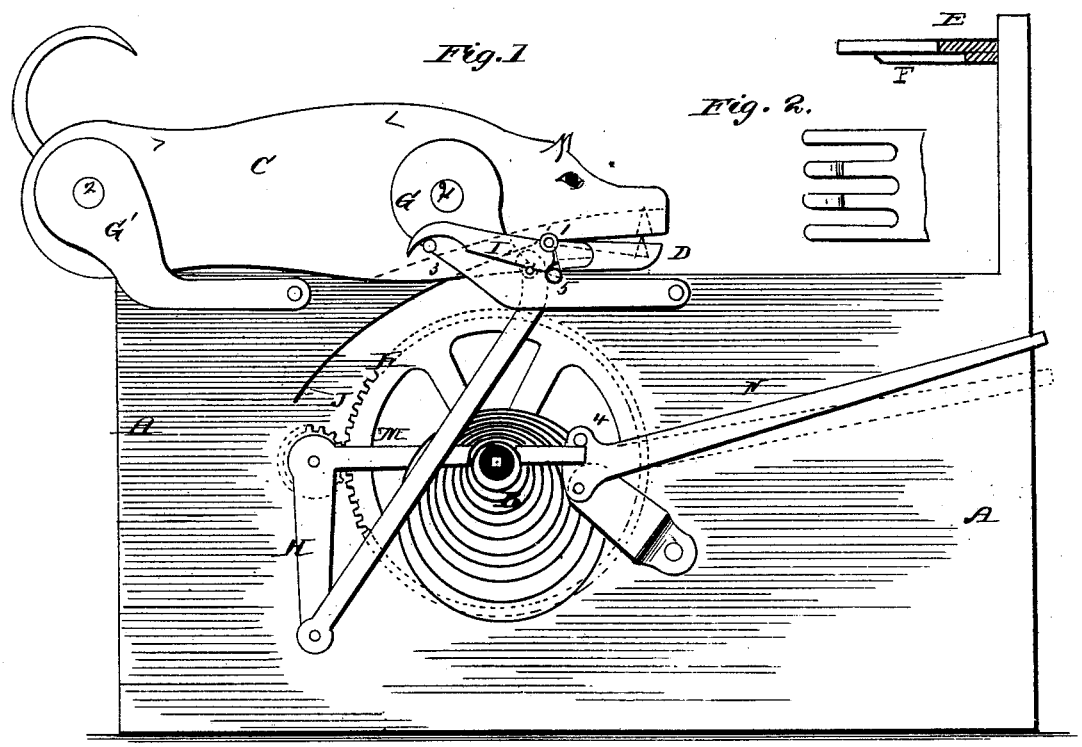
Witnesses
Fred G. Dieterich
George Binkenburg
Inventor
Enoch R. Morrison
by Earle H Smith
Atty

UNITED STATES PATENT OFFICE.

ENOCH R. MORRISON, OF NEW YORK, ASSIGNOR OF ONE-HALF HIS RIGHT TO STEPHEN CURTIS AND EDWIN H. ROWLEY, OF NEW YORK, N. Y., AND ONE-HALF TO JOSEPH E. WALTER, OF ELIZABETH, N. J.

IMPROVEMENT IN TOY BANKS.

Specification forming part of Letters Patent No. 206,893, dated August 13, 1878; application filed June 7, 1878.

*To all whom it may concern:*

Be it known that I, ENOCH R. MORRISON, of the city, county, and State of New York, have invented an Improved Automatic-Deposit Toy Bank, whereof the following is a specification:

My invention relates to a toy savings-bank having on top thereof, for instance, the figure of a dog or other animal, which, by means of clock-work, is made to spring forward, grasp a coin placed before it, retire, and deposit the coin in the receptacle or bank, the said movements being performed automatically.

The invention consists in a pair of jaws or levers, between which the coin is seized, which jaws are capable of a forward movement imparted by a clock-work through a suitable connection therefrom to the jaws. One of the latter has an arm, on which is a cam, working over a stud to open the jaws, and they are closed by a spring. To facilitate the taking of the coin with certainty, it is placed in a holder consisting of 'fingers, and the jaws aforesaid have teeth adapted to pass behind the coin and close, passing between the fingers. Combined with the clock-work is a lever for releasing the operating mechanism, and for arresting its action after each movement of the jaws.

The drawing annexed shows a mechanism that illustrates my invention.

Figure 1 is a general view exposing the interior mechanism. Fig. 2 is a top view of the coin-holder.

A is a suitable case, serving to receive the deposit, and also inclosing the clock-work, consisting of a spring, B, and a train of gearing. Upon the case A or bank reposes the figure of an animal, preferably a watch-dog. The body thereof and upper portion of the head C constitute one of a pair of levers or jaws, of which pair the lower jaw, D, of the animal is the mate, being pivoted at 1.

In front of the dog, on a post, E, is fixed a holder, F, in which the coin is placed, to be thence taken by the dog in his mouth. Said holder is in the form of several tines or fingers, split horizontally, and one part made slightly elastic.

The idea is to have the figure C dart forward, and, to carry out the semblance, I pivot the animal by his legs G G' to the case A, the legs being also jointed to the body at 2; but other ways may be used to allow of a forward movement. I prefer the pivoted legs, because they produce an upward or leaping, besides the forward, action.

As the animal or figure moves toward the holder F the lower jaw, D, is opened by means of a cam-surface on an arm, I, affixed to the said jaw, coming in contact with a stud, 3, on the fore leg G. Said jaw has teeth so placed therein as to pass between the tines of the holder F when the coin is to be seized.

The movement of the dog is effected by the clock-work in any competent manner. A simple way is to have a long crank, H, made fast to the shaft of a pinion, J, driven by the large wheel K, on the arbor of which the driving-spring B is connected, and then pivot a connecting-rod, L, to said crank and to the body of the dog—*i. e.*, one of the pair of levers C D. When the pinion is revolved the dog is caused to advance and to retire to the crouching posture at each revolution of the pinion and crank H.

M is a revolving arm, also affixed to the pinion J, and is caught upon and released from a stud, 4, on the thumb-lever N, which, being moved downward by a wiping action of the thumb or finger applied at 0, and then allowed to fly back, releases the arm M, but returns in time to arrest it and prevent the pinion and crank H from making more than one revolution; and it also locks the figure fast until again released by moving the lever N. When the arm M is released by a movement of the lever N the figure springs up and forward. The movement of the stud 3 along the cam or arm I opens the jaws, the teeth thereon pass by the coin in the holder F, whereupon the arm I falls off the stud 3, the jaws are closed upon the coin by force of a small spring, 5, the figure retires, and is brought down upon the case A with a light shock, that has the effect of causing the coin to slide backward into and down though a small passage (indicated by dotted lines) in one of the jaws, C, and thence into the case A. In the return movement of the figure the cam on arm I passes over the stud 3, the said arm yielding slightly for the purpose.

In the above invention I do not confine myself to the figure of a dog or any other figure. Nor do I confine myself to the pivoted legs, as the figure may move forward on wheels and otherwise.

I claim as my invention—

1. In an automatic-deposit toy bank, the combination of a pair of jaws, a clock-work mechanism, and a connecting link or pitman from the clock-work to the said jaws.

2. The holder F, consisting of tines or fingers, in combination with teeth applied to the seizing-jaws C D, and said teeth arranged for passing between the tines or fingers, substantially as described.

3. The downward passage for the coin from behind the teeth through the jaws, or one of them.

4. The combination of the arm I, stud 3, and a spring for opening and closing the body of the figure.

5. The combination of the arm M and connection L with the main jaw C or body of the animal.

6. The combination of the arm M and lever N.

ENOCH R. MORRISON.

Witnesses:
EARL H. SMITH,
A. VAN BLARCOM.